Figure 1:
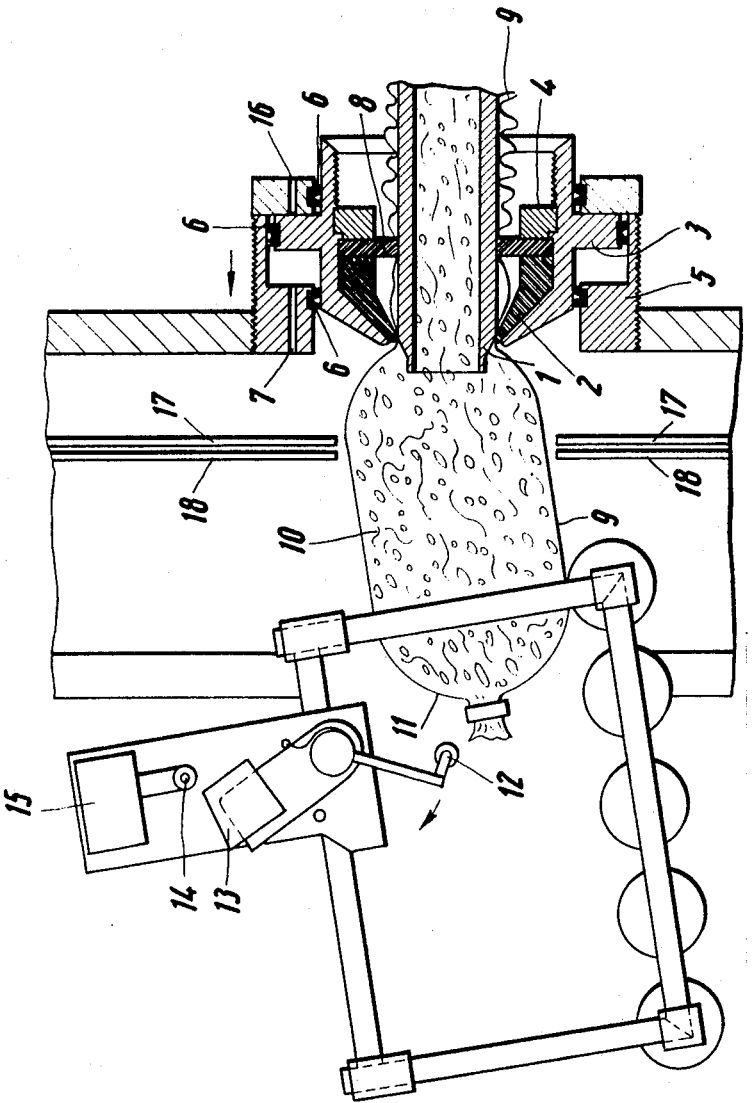

United States Patent [19]
Niedecker

[11] 3,748,690
[45] July 31, 1973

[54] SAUSAGE FILLING APPARATUS
[76] Inventor: Herbert Niedecker, 6243 Falkenstein (Taunus), Am Ellerhang 6, Germany
[22] Filed: Apr. 8, 1971
[21] Appl. No.: 132,464

[30] Foreign Application Priority Data
Apr. 17, 1970 Germany.................. P 20 18 454.7

[52] U.S. Cl. .................................................. 17/33
[51] Int. Cl. ............................................. A22c 11/02
[58] Field of Search ...................... 17/33, 34, 35, 41

[56] References Cited
UNITED STATES PATENTS
| | | | |
|---|---|---|---|
| 3,553,768 | 1/1971 | Wilmsen | 17/33 |
| 3,140,509 | 7/1964 | Muller | 17/33 |
| 3,306,184 | 2/1967 | Hanau | 17/34 X |

FOREIGN PATENTS OR APPLICATIONS
| | | | |
|---|---|---|---|
| 1,293,632 | 4/1969 | Germany | 17/34 |
| 227,009 | 7/1969 | Sweden | 17/34 |

Primary Examiner—Lucie H. Laudenslager
Attorney—Burgess, Dinklage & Sprung

[57] ABSTRACT

In an apparatus for filling an endless tubular distensible casing closed at one end and extending over a filling pipe, the apparatus including means for constricting said filled casing at predetermined time intervals, means for forming two spaced closures at the constriction, and means for severing said casing between said closures, the improvement which comprises means for releasing additional casing toward said constricting means when the latter are actuated, whereby spaced is provided to take up filling displaced during said constriction. The release of additional casing is achieved by a snubbing element which bears against the filling pipe with the casing therebetween and which is displaced forwardly during constriction. The forward displacement either pushes additional casing forward or releases the casing slightly so it can be pulled forward by the force of displaced filling during constriction.

12 Claims, 12 Drawing Figures

PATENTED JUL 31 1973
3,748,690
SHEET 1 OF 6

Inventor:
Herbert Niedecker
By: BURGESS, DINKLAGE & SPRUNG
Attys.

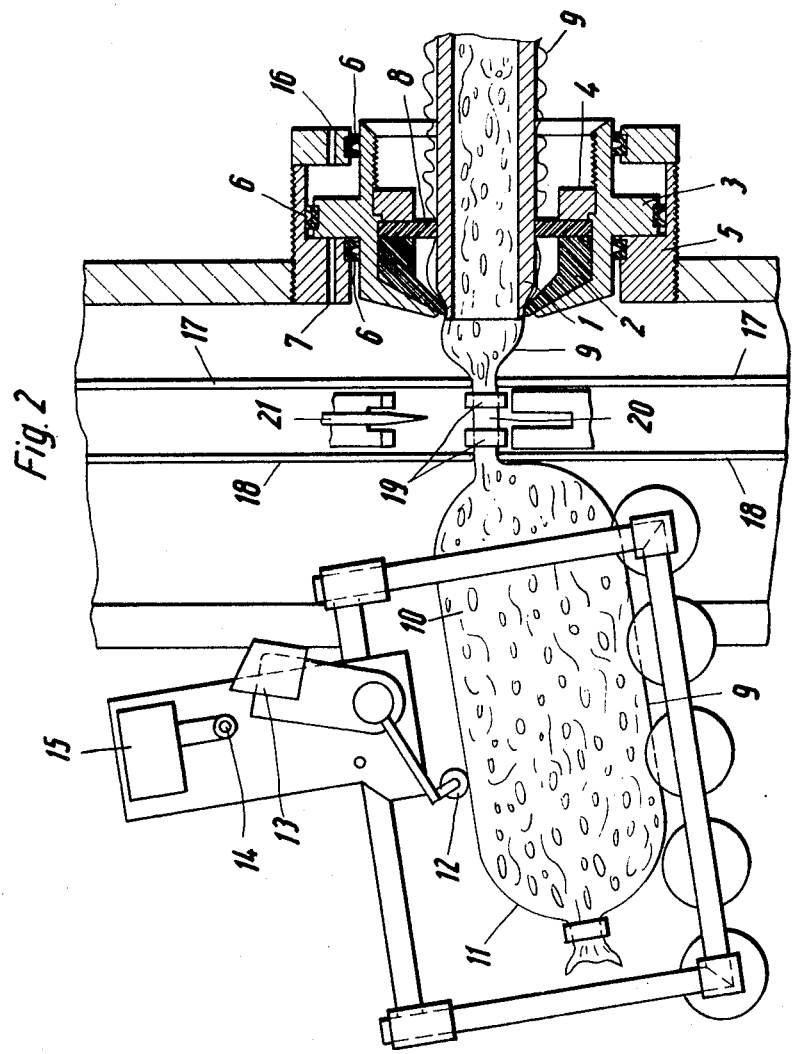

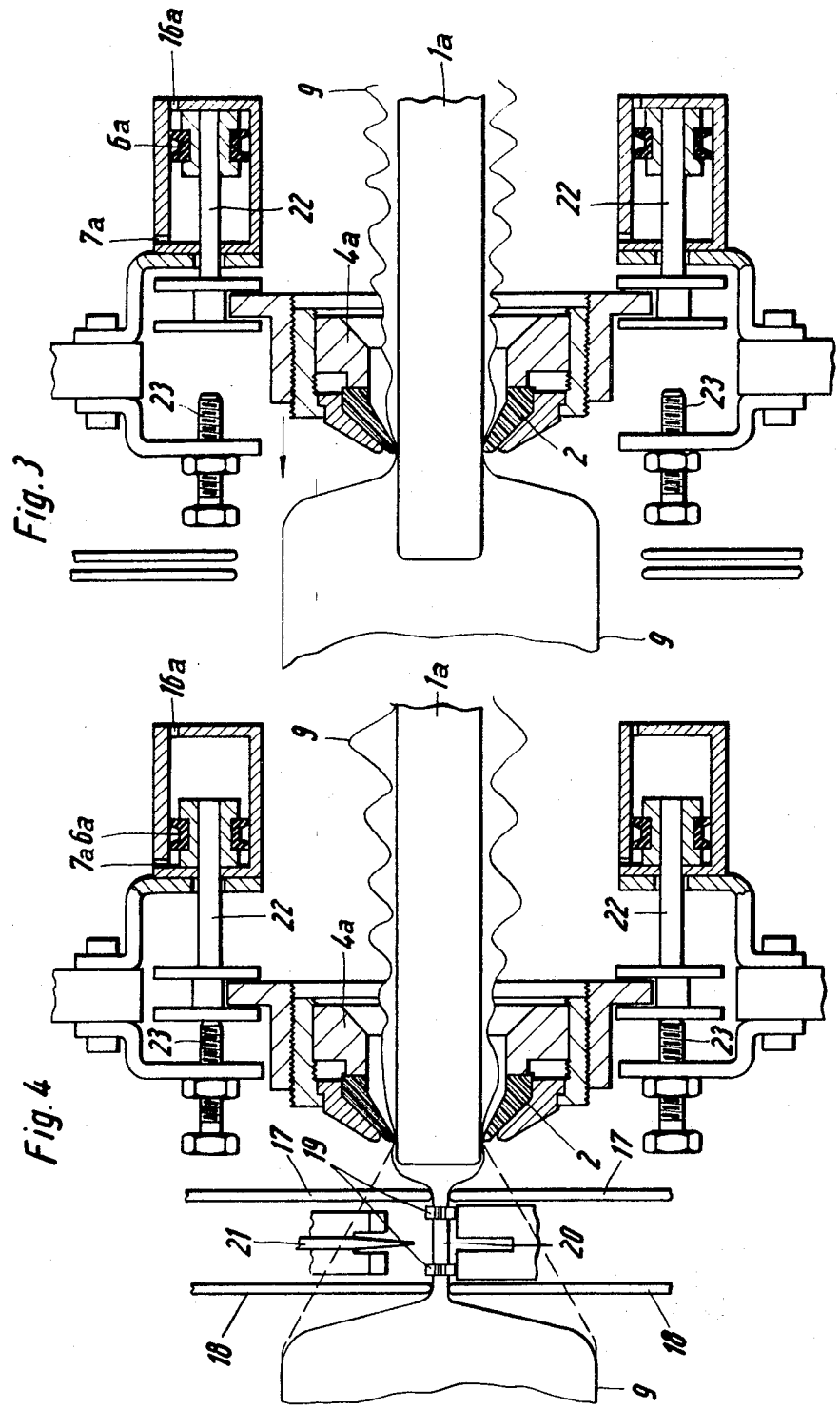

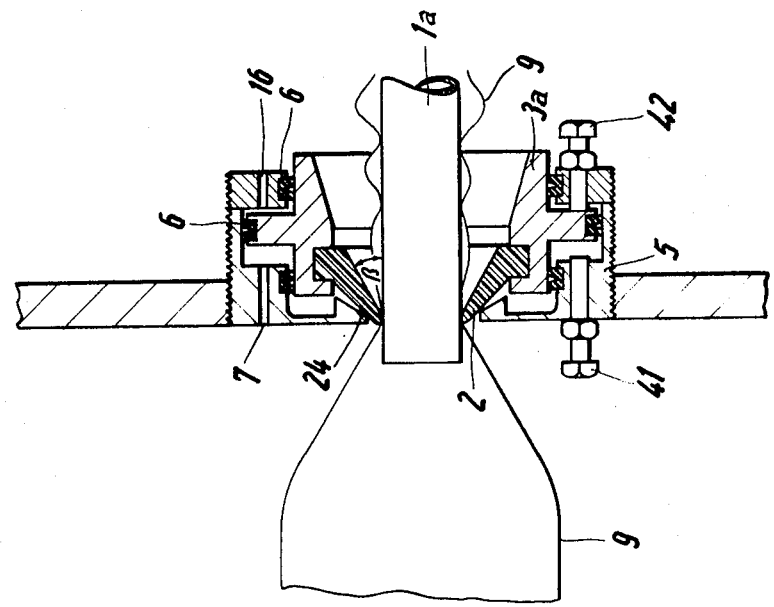
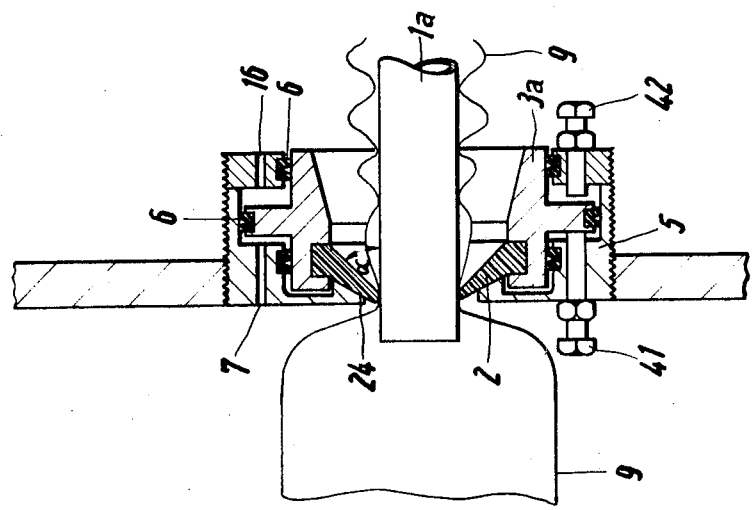

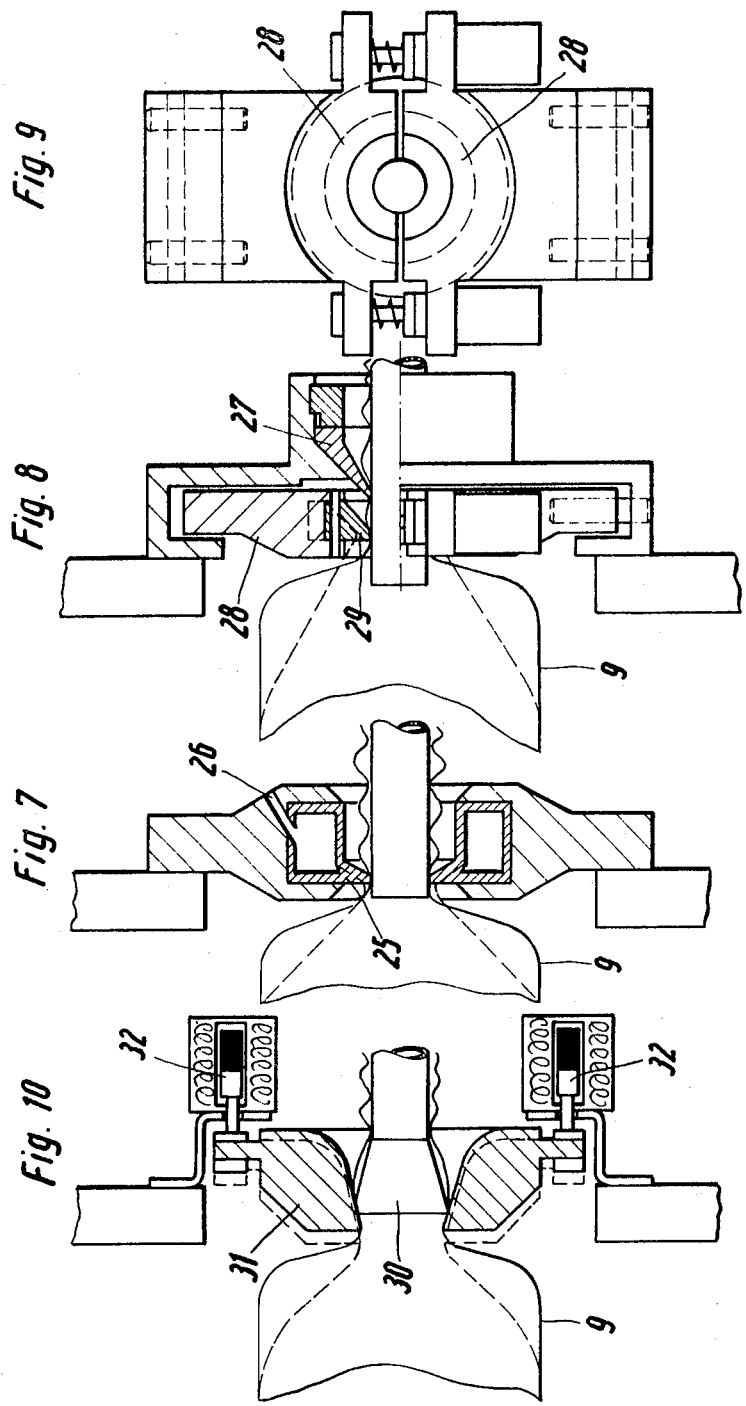

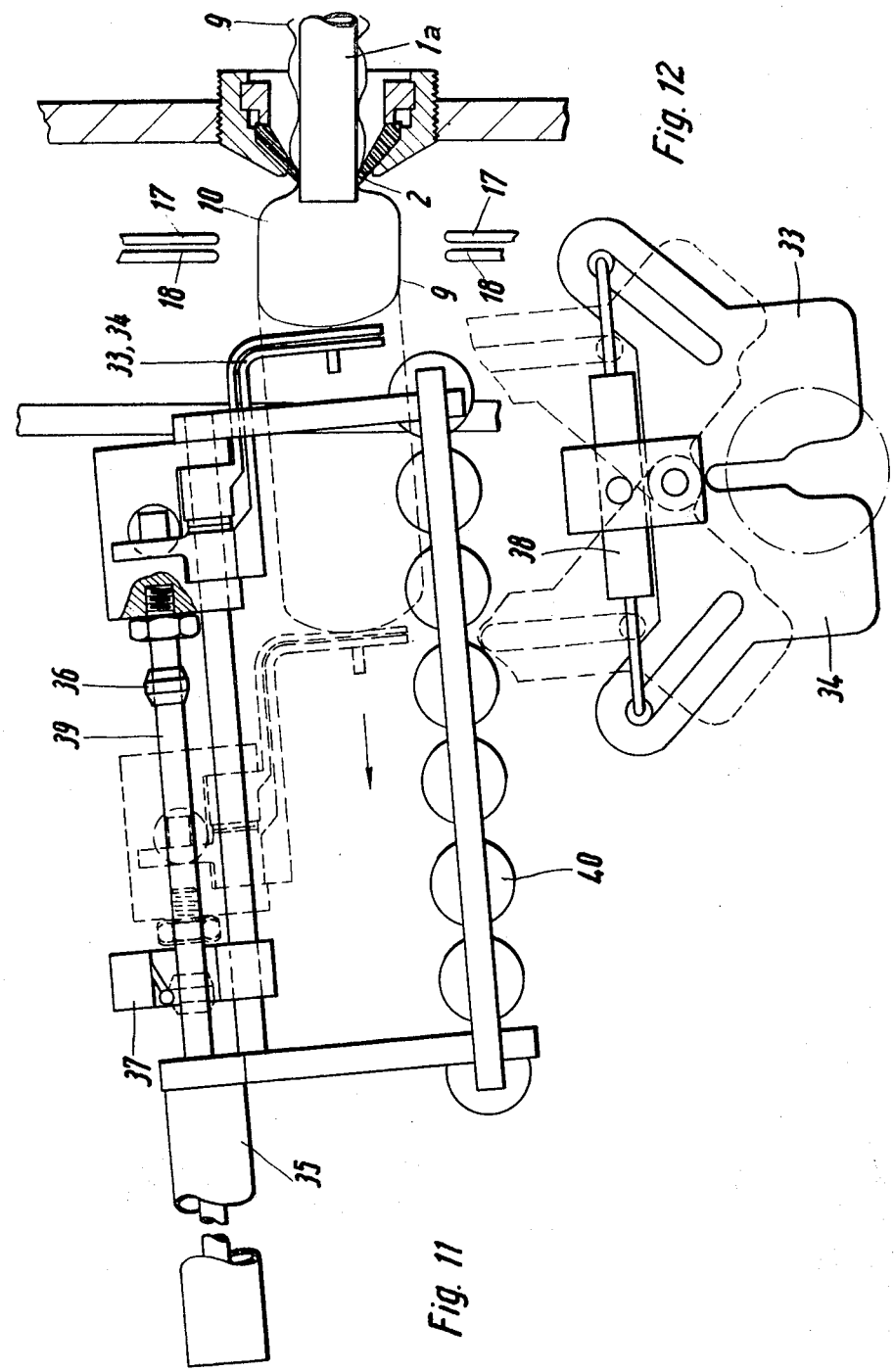

SAUSAGE FILLING APPARATUS

This invention relates to improvements in an apparatus for filling sausage casings.

In operations in which packaging tubing is filled, e.g., with sausage composition through a filling pipe, it is known to use a snubbing element, e.g., a snubbing ring of rubber, for snubbing the packaging tubing or casing fitted on the filling pipe. By this snubbing, it is ensured that the packaging tubing will not be pulled off the filling pipe faster than desired. The snubbing element may be referred to as a casing snubber. By means of a single screw, the snubbing force exerted by the snubbing ring may be adjusted to the value which is desirable in view of the filling material and the packaging material. Difficulties arise, however, when stiff material, such as partly frozen sausage composition, is to be filled into the sausage casing. In such instances the sausage casing must be subjected to a strong snubbing force so that the sausage composition will properly fill out the casing. When the casing has been filled, an additional length of casing is required so that during the constriction portion of the sealing cycle there is a place to receive displaced filling material. When the snubbing element is set to exert a strong snubbing force it prevents release of the requisite additional casing portion so that the casing is often ruptured during the constricting and displacing operations under the force of filling material which has no receptacle.

Variable snubbing elements, which are automatically controlled, are also known in connection with filling and twisting pipes but these snubbing elements do not serve to release the casing portion when the filling operation has been completed in order to enable the constricting and displacing operations to be performed.

It is accordingly an object of the invention to provide an apparatus suitable for filling sausage casings which holds the casing firmly during filling but nonetheless permits casing to be released to accommodate displaced filling material during the construction and closing portions of a sausage-filling cycle.

These and other objects and advantages are realized in accordance with the present invention wherein the filling pipe of a conventional filling machine is provided with a snubbing element bearing thereagainst with the casing held therebetween. The snubbing element is arranged automatically to release an additional length of casing, immediately after the completion of the filling operation, to accommodate filling material which will be displaced during constriction so that the packaging casing can be closed.

During the filling operation, the snubbing element exerts such a snubbing force on the casing to be filled that the filling material properly fills the casing. When the filling operation has been terminated, the snubbing force is reduced to such an extent that the required additional casing can be pulled off when the filled casing is constricted and the filling material is displaced.

In another preferred embodiment of the invention, the snubbing element releases the additional tubing portion in that the snubbing element positively feeds or pushes additional casing forwardly in the filling direction to the required extent when the filling operation has been completed.

Also in accordance with the invention, the adjustment of the snubbing element to exert the desired snubbing forces during and after the filling operation is controlled either by the casing itself when filled to the desired extent, e.g., by means of a stop, or by a circuit which is connected to the filling machine, or by a timer. For instance, a sensing element or feeler may be used, which detects the closed end portion of the sausage and controls the snubbing element. The adjustable feeler may also control the filling machine and the amount of sausage composition supplied to each sausage. This eliminates the need for a metering device often provided on the filler.

The process according to the invention may be carried out by an apparatus in which the snubbing element or that portion of the filling pipe on which the snubbing element is fitted is designed so that the additional tubing portion required when the filled tubing portion is to be constricted, whereafter the filling material is to be displaced so that the packaging tubing may then be closed, is automatically released by the snubbing element immediately after the completion of the filling operation.

The snubbing element consists preferably of a snubbing ring and is mounted on the filling pipe to be axially slidable therealong while exerting an approximately constant snubbing force. When the packaging tubing is being filled, the snubbing element is in its rear or upstream position whereas it is automatically displaced toward the forward or downstream end of the filling pipe when the filling operation has been completed.

The snubbing ring may comprise snubbing lips which consist of resilient material and are carried by a holding ring. The filling pipe may have portions which differ in outside diameter so that the snubbing force is changed as the ring is displaced along the portions of the filling pipe which differ in diameter.

In the snubbing element according to the invention, the movement of the free end of the snubbing lips consisting of resilient material may be limited by a stop. The snubbing element may comprises a movable snubbing lip holder in the form of a piston, which is axially slidable to change the angle between the snubbing lips and the filling pipe.

The snubbing element may consist of any element which is designed to exert a snubbing force which can be changed by control elements during or after the filling operation.

The process according to the invention and the apparatus used to carry out the process have the advantage that during the filling operation the casing snubber is adjusted to exert such a strong snubbing force that the packaging tubing is pulled off at such a low speed that the filling material tightly fills the sausage whereas, when the filling operation has been completed, the snubbing force exerted by the casing snubber is reduced to such an extent that the packaging tubing can be pulled off during the operations by which the filled sausage casing is constricted to form a tail and the filling material is displaced, so that damage or destruction is avoided. It is also possible in this manner to prevent an ingress of air or liquid into the tubing section during or after the filling operation.

A number of preferred embodiments of the invention are shown by way of example in the drawings, in which FIG. 1 is a sectional view showing an apparatus having a stepped filling pipe in a strongly snubbed position during the filling operation, FIG. 2 shows the same apparatus in a lightly snubbed position during the constricting, displacing and closing operations.

FIG. 3 is a sectional view showing another embodiment of a snubbing device including a displaceable snubbing element during the filling operation, FIG. 4 is a sectional view showing the snubbing device according to FIG. 3 during the constricting, displacing and closing operations, FIG. 5 is a sectional view showing a snubbing device having snubbing lips extending at a large angle and thus exerting a strong snubbing force, FIG. 6 shows the same device wherein the snubbing lips have been displaced to a smaller angle to exert a small snubbing force, FIG. 7 is a sectional view showing a snubbing device comprising a hollow snubbing ring or tube, FIG. 8 is a partial sectional view of a snubbing device including a snubbing ring of light constant force and an additional block-type snubber, which is automatically controlled, of variable force, FIG. 9 is an elevation showing the snubbing device of FIG. 8, FIG. 10 is a sectional view showing a snubbing device in which a resilient ring is disposed at the end of the filling pipe, to cooperate with a movable outer ring, FIG. 11 is a lateral elevation of a device including stops for the sausage casing, which stops yield during the filling operation and act as a variable snubbing element, and FIG. 12 is a front view of the apparatus of FIG. 11.

Referring now more particularly to the drawings, FIG. 1 is a sectional view showing a snubbing element for exerting an automatically variable snubbing force. The snubbing force is changed by means of a stepped filling pipe 1 in conjunction with a slidable snubbing ring, comprising snubbing lips 2. The snubbing ring is mounted in a slidable piston 3, which acts as a snubbing lip holder. The piston 3 is disposed in an annular cylinder 5 and is sealed by seals 6. When the actuating fluid, such as air, is supplied through the bore 7, the piston 3 is moved to the position shown in FIG. 1 and the snubbing lips 2 abut that portion of the filling pipe 1 which is larger in diameter so as to exert their maximum snubbing force. A sealing ring 8 is disposed behind the snubbing ring and lips 2. The snubbing ring and the sealing ring 8 are held in position by the annular nut 4. The filling material 10, such as sausage composition, is discharged from the filling machine through the filling pipe 1 and enters the packaging tubing, i.e. sausage casing 9, to fill the latter fully because the snubbing ring comprising the snubbing lips 2 strongly snubs the packaging tubing 9 on the filling pipe 1.

As soon as the end 11 of the package, e.g., the sausage, reaches the sensing lever 12, the lever is moved in the direction of the arrow so that the cam 13 actuates the stem 14 of the switch or valve 15. The switch 15 may be used to energize a solenoid valve, which supplies compressed air through the bore 16 so that the piston 3 and the snubbing ring are moved to the left in the direction of the arrow until the position shown in FIG. 2 is reached. In this operation, a certain length of the packaging tubing is carried along to the left and, because the snubbing lips 2 of the snubbing ring now engage that portion of the filling pipe 1 which is smaller in diameter and thus exert a reduced snubbing action, the filling tubing may be pulled off more easily and will not be damaged during the constricting, displacing and closing operations.

At the same time, the filling operation is terminated by the switch 15 so that the sausage composition is metered, and the closing machine is started.

In accordance with FIG. 2, the displacing plates 17, 18 of the closing machine now constrict the packaging tubing and displace the filling material. The closing clips 19 are applied around the tail 20 of the tubing and the tail 20 may subsequently be severed between clips 19 by the cutter 21. The closing machine then restarts the filling machine and initiates flow of pressurized fluid through bore 7 to move the piston 3 and lips 2 back to the positions shown in FIG. 1.

The stepped filling pipe shown in FIGS. 1 and 2 may be replaced by a normal filling pipe having a rounded end in which case the snubbing lips 2 of the snubbing ring merely disengage the cylindrical portion of the mouthpiece of the filling pipe during that portion of the cycle in which the tubing is constricted and the filling material is displaced.

FIG. 3 shows an embodiment of a snubbing device for exerting a constant snubbing force. In that device the additional tubing portion required to accommodate displaced filling material during constriction of the filled tubing is provided for by displacement of the snubbing lips 2 to the left in the direction of the arrow, e.g., by means of a pneumatic actuator 22. The increment by which the tubing is moved may be limited by adjustable stops 23. FIG. 4 shows the displaced snubbing ring comprising the snubbing lips 2 during the constriction, displacing and closing operations carried out on the casing 9. Elements 1a, 4a, 6a, 7a and 16a function as do their respective counterparts 1, 4, 6, 7 and 16 in FIGS. 1 and 2.

FIGS. 5 and 6 show a different embodiment of a snubbing device for exerting an automatically variable snubbing force. The snubbing lips 2 of resilient material are forced against the engaging edge 24 by the piston 3a, which acts as a snubbing lip holder, so that the angle $\alpha$ between the snubbing lips and the filling pipe 1a is large and the desired strong snubbing force is exerted on the packaging tubing 9 during the filling operation. The stop screws 41 and 42 may be used to set the maximum and minimum snubbing forces, respectively. FIG. 6 shows the piston 30 displaced to the right so that the snubbing lips 2 define a smaller angle $\beta$ with pipe 1a whereby the snubbing force is reduced during the constriction, displacing and closing operations.

FIG. 7 shows another embodiment of a snubbing device for exerting an automatically variable snubbing force. In this embodiment, the snubbing ring consists of a hollow annular collar or tubular ring 25. The pressure fluid may be supplied through a bore 26. By means of control elements, the pressure of the fluid and with it the pressure in the snubbing ring 25 and thus the force of the ring against pipe 1a may be varied to ensure that different braking forces will be exerted during the filling operation and the constricting and displacing operations.

FIGS. 8 and 9 show an embodiment of a snubbing device in which a snubbing ring 27 exerts a constant, light snubbing force during the constricting of the filled tubing and the displacement of the filling material, and also prevents an ingress of air or liquid into the tubing section. The strong braking force during the filling operation is exerted by a block-type snubber 28 comprising snubbing blocks 29.

FIG. 10 shows a snubbing device in which a resilient ring 30 is attached to the end of the filling pipe 1a. In this embodiment the snubbing force is changed by means of a conical outer ring 31 which is actuated by an annular solenoid or a plurality of individual solenoids 32.

FIGS. 11 and 12 show an embodiment which comprises a permanently settable snubbing ring including snubbing lips 2 and which provides the small snubbing force required for the constricting and gathering operation. Firm packing of the casing is ensured in this case by stops 33, 34 which are displaceable in the direction of the arrow against an adjustable back-pressure, which may be adjusted by means of a controllable pneumatic or hydraulic actuator 35. The control cam 36 is thus advanced to operate the control switch 37 when the elements reach the positions shown in dotted lines, which removes the snubbing force exerted by the cylinder 35 and causes the actuator 38 to be actuated at the same time. The latter actuator swings the stop plates 33, 34 about a common pivot axis from their full position to the position shown in dotted lines in FIG. 12. The filling material, e.g., sausage composition, may now yield during the constricting and displacing operations, and the displacing plates 17, 18 may pull off additional packaging tubing 9. In the meantime, the piston rod 39 may move the stop plates 33, 34 to the right opposite to the direction of the arrow in preparation for their pivoting downwardly at the start of the next cycle. The apparatus may be provided with rollers 40, which guide and facilitate the delivery of the filled casings.

It will be appreciated that the instant specification and examples are set forth by way of illustration and not limitation, and that various modifications and changes may be made without departing from the spirit and scope of the present invention.

What is claimed is:

1. An apparatus for filling, with an extrudable filling material such as a sausage composition, a tubular distensible casing having a mouth at one end and closed at the other, such as a sausage casing, said apparatus comprising an extrusion pipe through which said filling material is supplied and about which the mouth of said casing is adapted to be positioned, a snubbing element urging said casing against said pipe and permitting sliding of said casing over said pipe under the force of filling material supplied to said casing during a filling time interval, means for sensing when said casing has been filled to a predetermined extent and operating said snubbing element to slide said casing over said pipe independently of the force of filling during a constricting time interval, means for constricting filled casing beyond the end of said pipe after the sensing means has been actuated, filling material displaced during construction flowing into additional casing which has slid over said pipe during the constricting time interval, means for applying clip means to said casing at its constriction, means for severing said casing adjacent said clip means, and means for restoring said snubbing element to initial position.

2. An apparatus according to claim 1, wherein said snubbing element is slidably displaceable during said constricting time interval from an upstream to a downstream position along said pipe, said displacement being actuated by said sensing means, displacement of said snubbing element carrying said casing therewith to provide the additional casing needed during constriction.

3. An apparatus according to claim 2, wherein the downstream end of said pipe is of reduced diameter, displacement of said snubbing element to said reduced diameter portion reducing the snubbing force against said casing and permitting said independent sliding of said casing.

4. An apparatus according to claim 2, wherein said snubbing element includes a resilient lip arranged at a predetermined angle relative to said pipe with said casing therebetween, displacement of said snubbing element serving to reduce the angle between said lip and pipe and thereby permitting said independent sliding of said casing.

5. An apparatus according to claim 1, wherein said snubbing element comprises a distensible fluid filled annular collar surrounding said pipe with said casing therebetween, withdrawal of fluid from within said collar reducing the force with which said casing is held against said pipe so as to permit said independent sliding of said casing.

6. An apparatus according to claim 5, wherein the snubbing element comprises at least two components urging said casing against said pipe, one of said components exerting a fixed snubbing force and another a variable snubbing force.

7. An apparatus according to claim 1, wherein the snubbing element comprises a displaceable resilient ring bearing against the end of said pipe, displacement of said ring varying the snubbing force.

8. An apparatus according to claim 1, including a sealing ring positioned upstream of said snubbing element and bearing against said pipe with said casing therebetween, whereby air and liquid are prevented from entering said casing from the outside of said pipe during a constricting interval.

9. In an apparatus having a filling pipe for filling a tubular distensible casing closed at one end and extending over said filling pipe, the apparatus including means for constricting said filled casing, means for actuating said constriction means at predetermined time intervals, means for forming a closure adjacent the constriction, and means for severing said casing adjacent said closure, the improvement which comprises means for advancing additional casing toward said constricting means when the latter is actuated, whereby space is provided to take up filling displaced during said constriction.

10. An apparatus according to claim 9, wherein said advancing means comprises a snubbing element bearing against said pipe with said casing therebetween, advance of said additional casing being effected by displacement of said snubbing element carrying said casing therewith.

11. An apparatus according to claim 9, wherein said advancing means comprises a snubbing element, said snubbing element being displaceable between two positions each bearing against said pipe with said casing therebetween, advance of said additional casing being effected by displacement of said snubbing element from its first position to its second position where it bears less forcefully against said pipe so that additional casing can be pulled over said pipe by the force of filling material displaced during constriction.

12. An apparatus according to claim 9, wherein said means for actuating said constricting means is controlled by the filled casing.

* * * * *